United States Patent [19]

Kurimoto

[11] Patent Number: 4,656,345

[45] Date of Patent: Apr. 7, 1987

[54] BAR CODE READING APPARATUS

[75] Inventor: Yukuo Kurimoto, Shizuoka, Japan

[73] Assignee: Tokyo Electric Co., Ltd., Tokyo, Japan

[21] Appl. No.: 774,926

[22] Filed: Sep. 11, 1985

[30] Foreign Application Priority Data

Sep. 27, 1984 [JP] Japan ................................ 59-202343
Sep. 27, 1984 [JP] Japan ................................ 59-202344

[51] Int. Cl.$^4$ ............................................. G06K 7/10
[52] U.S. Cl. ..................................... 235/472; 235/455
[58] Field of Search ................................ 235/472, 455

[56] References Cited

U.S. PATENT DOCUMENTS 4,542,258  9/1985  Sanner ............................ 235/472 X Primary Examiner—Harold I. Pitts
Attorney, Agent, or Firm—Frishauf, Holtz, Goodman & Woodward

[57] ABSTRACT

A bar code reading apparatus comprises a reading unit for optically reading a bar code and generating an output data corresponding to this bar code, a memory, and a data processing unit for storing the output data from the reading unit into the memory and making a bar code data in accordance with the content of the memory. This reading apparatus further has a mode selection flag (PSF) for selectively instructing either one of the first and second modes, and the data processing unit stores the output data from the reading unit as it is into the memory when the first mode is designated by the mode selection flag (PSF), while the data processing unit stores the inverted data of the output data from the reading unit into the memory when the second mode is set by the mode selection flag (PSF).

10 Claims, 23 Drawing Figures

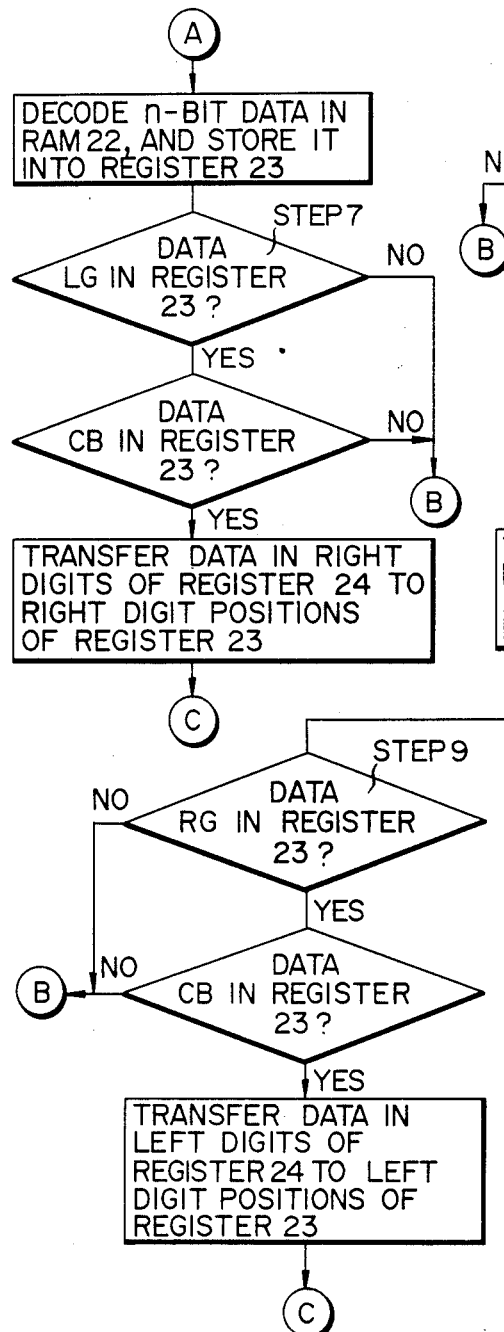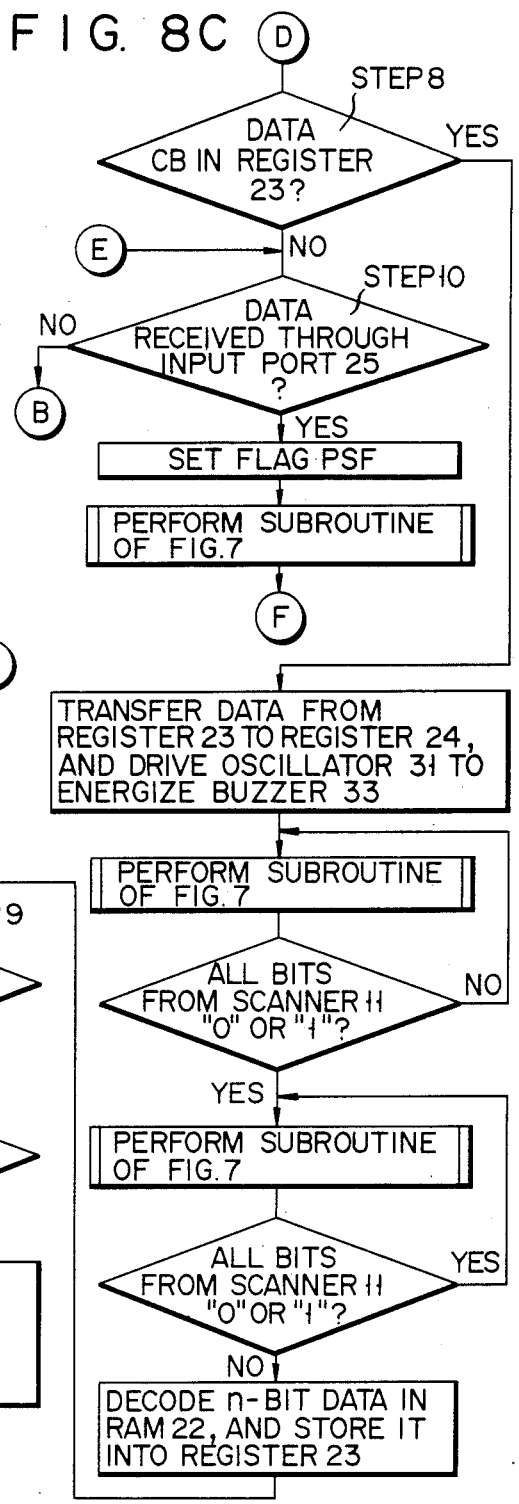

| | 9 | 1 | 2 | 3 | 4 | 5 | CB | 6 | 7 | 8 | 9 | 0 | 4 | RG |
|---|---|---|---|---|---|---|---|---|---|---|---|---|---|---|
| LG | | | | | | | | | | | | | | |

FIG. 9A

| F | F | F | F | F | F | 5 | CB | 6 | 7 | 8 | 9 | 0 | 4 | RG |
|---|---|---|---|---|---|---|---|---|---|---|---|---|---|---|

FIG. 9B

| LG | 9 | 1 | 2 | 3 | 4 | 5 | CB | 6 | 7 | F | F | F | F | F |
|---|---|---|---|---|---|---|---|---|---|---|---|---|---|---|

FIG. 9C

| LG | 9 | 1 | 2 | 3 | 4 | 5 | CB | 6 | 7 | 8 | 9 | 0 | 4 | RG |
|---|---|---|---|---|---|---|---|---|---|---|---|---|---|---|

FIG. 9D

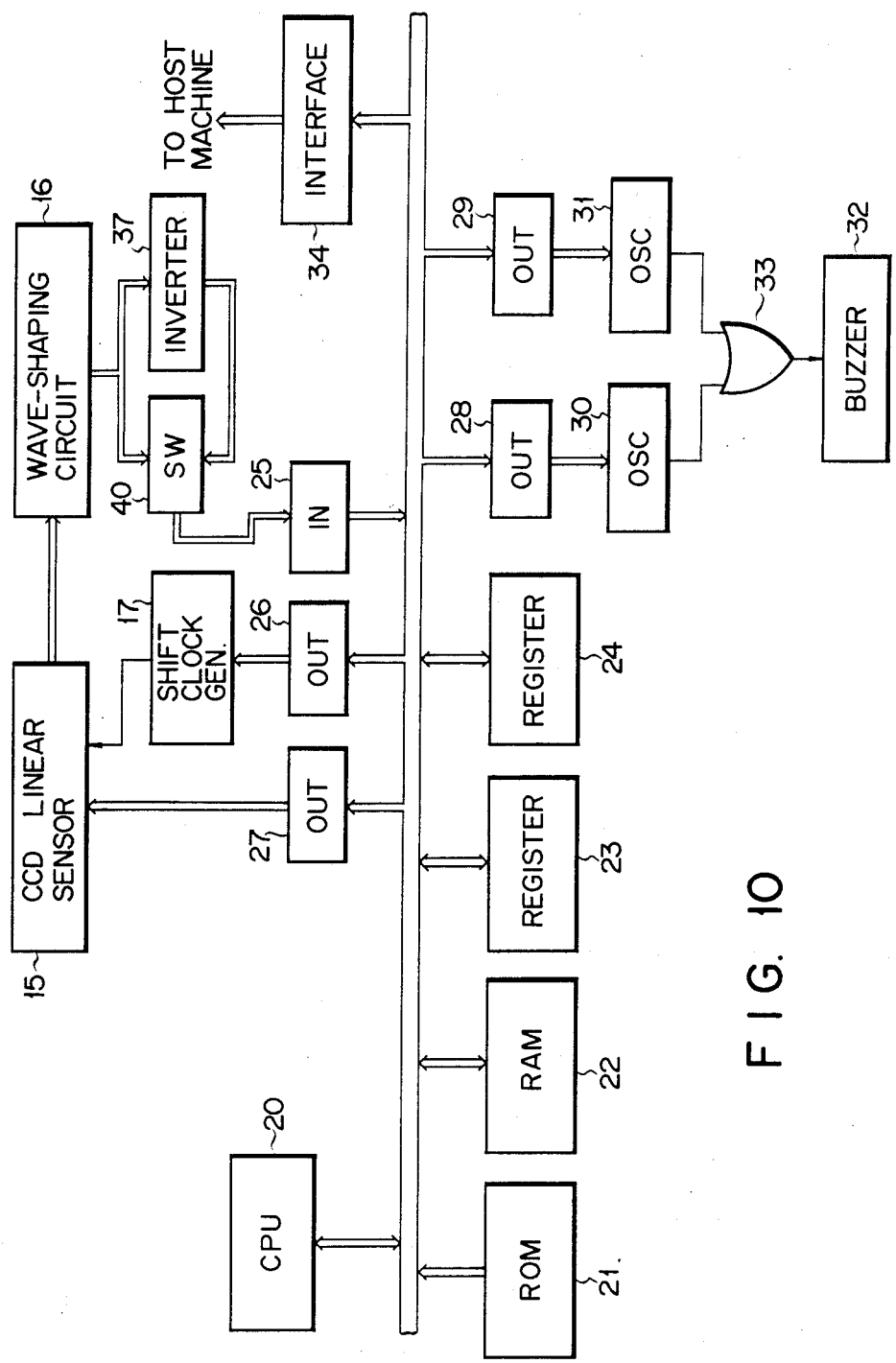
F I G. 10

BAR CODE READING APPARATUS

BACKGROUND OF THE INVENTION

The present invention relates to a bar code reading apparatus for optically reading a bar code.

Hitherto, bar codes printed on packages of articles have ordinarily been dark black and lacking in brightness, while the background has been pure white having high brightness. For the purpose of properly reading such bar codes, bar code reading apparatuses have been specially designed. Many packages, however, are colored other than in the manner described above, i.e., the packages being of a dark color, creating the possibility that, should an equally dark bar code be printed on such a package, an erroneous reading will ensue. In the interest of preventing such erroneous readings many packages are specially designed and printed so as to include a designated white area on which a black bar code can be printed. Such specific printing, though it solves the problem of erroneous readings, only contributes to an increase both in the cost of printing and, ultimately, in the cost of the articles themseleves.

In consideration of such disadvantages, there are packages printed such that the package color is used as the background color of the bar code region. Consequently, by printing the bar code in a color having a brightness different from that of the background color, only two print colors are used, thereby reducing the print cost. Naturally, as described above, if the two print colors are white (background) and black (bar code), the given bar code can be read by a conventional bar code reading apparatus.

However, in some cases, packages of a dark color may be used so as to provide a more attractive article package, thereby being inappropriately designed for easy reading by a conventional bar code reading apparatus. There are, in fact, some packages in use whose background color is black and whose bar code and characters are printed in a gold color, such as, for example, packages of tobaccos made in the U.S.A. Similarly, some packages have a background color of drak gray or black and a bar code and characters of light gray or the like. Inevitably, the reading of such bar codes by a conventional bar code reading apparatus cannot be done accurately, inverted bar code being obtained as a result of the inversion of the usual background and bar code colors.

SUMMARY OF THE INVENTION

It is an object of the present invention to provide a bar code reading apparatus which can read both a bar code having a high brightness or a background having low brightness, and a bar code having low brightness or a background having a high brightness.

This object is accomplished by a bar code reading apparatus comprising a reading unit for optically reading a bar code, and for generating output data corresponding to the bar code read out; a mode selecting unit for selectively setting either one of a first or a second mode; a memory; and a data processing unit which, when the first mode is designated by the mode selecting unit, stores the output data from the reading unit into the memory and, when the second mode is designated by the mode selecting unit, which stores the inverted data of the output data from the reading unit into the memory, correct bar code data being formed in accordance with the content of this memory.

According to the present invention, in the first mode in which, for example, dark bar code is printed on a bright background, the output data from the reading unit is stored in the memory while, in the second mode in which bright bar code is printed on a dark background, inverted data of the output data from the reading unit is stored in the memory. Therefore, data properly indicative of the bar code is stored in the memory, to the purpose that, regardless of its brightness level, it can be correctly read.

BRIEF DESCRIPTION OF THE DRAWINGS

FIGS. 8A to 8C are flowcharts explaining the operation of the bar code reading apparatus shown in FIG. 5;

FIGS. 9A to 9D show bar code data which is stored into registers in FIG. 5;

FIG. 10 is a block diagram of a bar code reading apparatus according to another embodiment of the present invention;

DETAILED DESCRIPTION OF THE PREFERRED EMBODIMENTS

Figure 1:
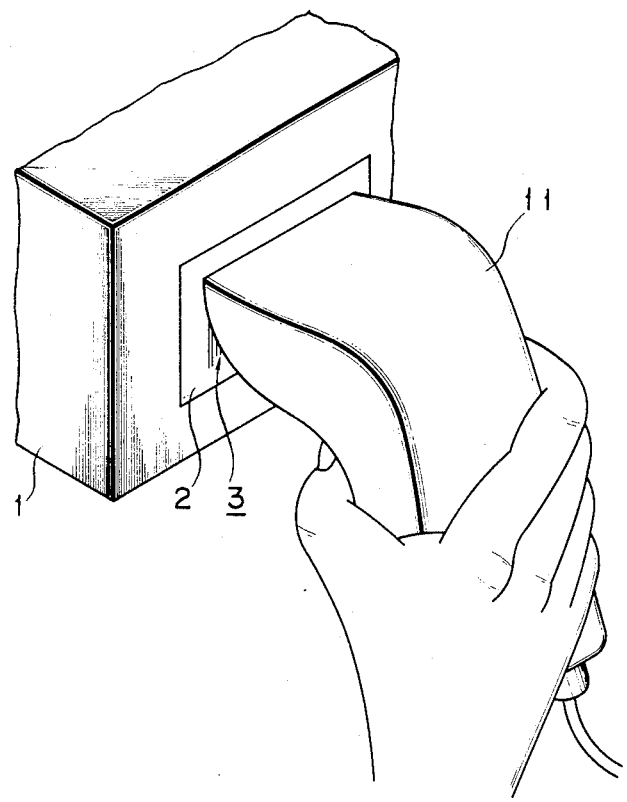
FIG. 1 shows a hand held scanner used in a bar code reading apparatus according to one embodiment of the present invention.
Figure 2:
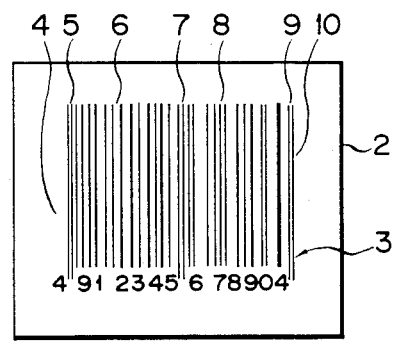
FIG. 2 shows an example of a bar code detected by the hand held scanner shown in FIG. 1.

One embodiment of the present invention will now be described with reference to the drawings. By pressing the hand held scanner 11 of a bar code reading apparatus according to one embodiment of the present invention onto a label 2 stuck to an article 1, as shown in FIG. 1, a bar code 3 printed on the label 2 is read. As shown in FIG. 2, the bar code 3 is the universal product code (UPC), and comprises, over an area extending from left to right, a left margin 4 of x modules, a left guard bar 5 of three modules, a data character 6 of forty-two modules which corresponds to six characters, a center bar 7 of five modules, a data character 8 of forty-two modules which corresponds to six characters, a right guard bar 9 of three modules, and a right margin 10 of y modules. The sum of the module numbers x and y is set at 18 or less.

Figure 3:
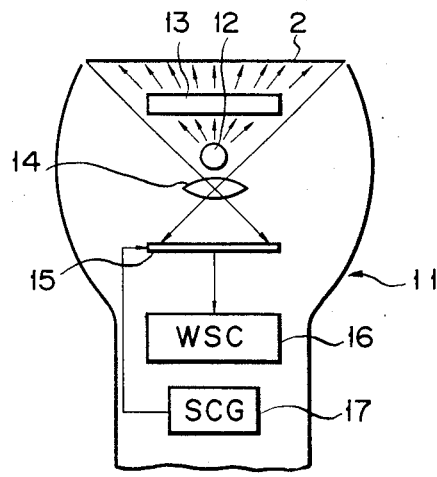
FIG. 3 is a constructional diagram of the hand held scanner shown in FIG. 1.
Figure 4:
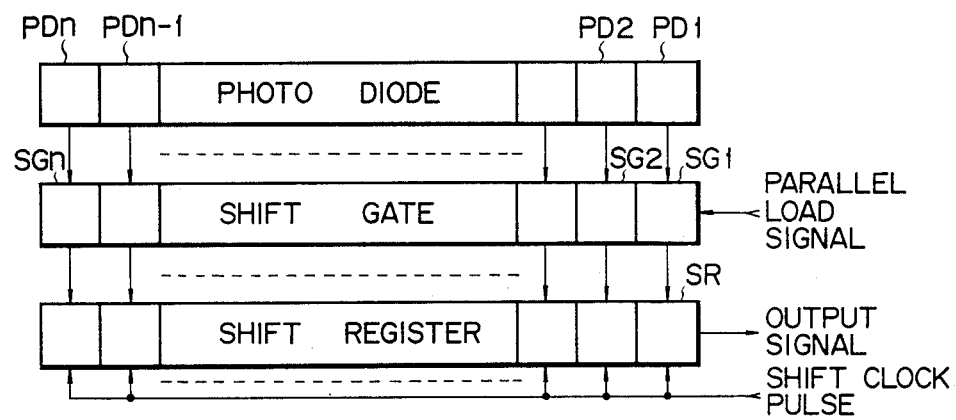
FIG. 4 is a constructional diagram of a CCD linear sensor shown in FIG. 3.

As shown in FIG. 3, the scanner 11 includes a lamp 12, a diffusion lens 13 to diffuse the light of the lamp 12 in the direction of the label 2; a CCD linear sensor 15, similar to an image sensor, for receiving the reflected lights from the label 2 through a lens 14; a wave-shaping circuit (WSC) 16 to shape the waveform of an output pulse from the sensor 15, and a shift clock generator circuit (SCG) 17 to supply a shift clock signal to the sensor 15. As shown in FIG. 4, the CCD linear sensor 15 is constituted such that n photodiodes $PD_l$ to $PD_n$ are arranged in a line and connected to a CCD shift register SR through shift gates $SG_l$ to $SG_n$, respectively.

Figure 5:
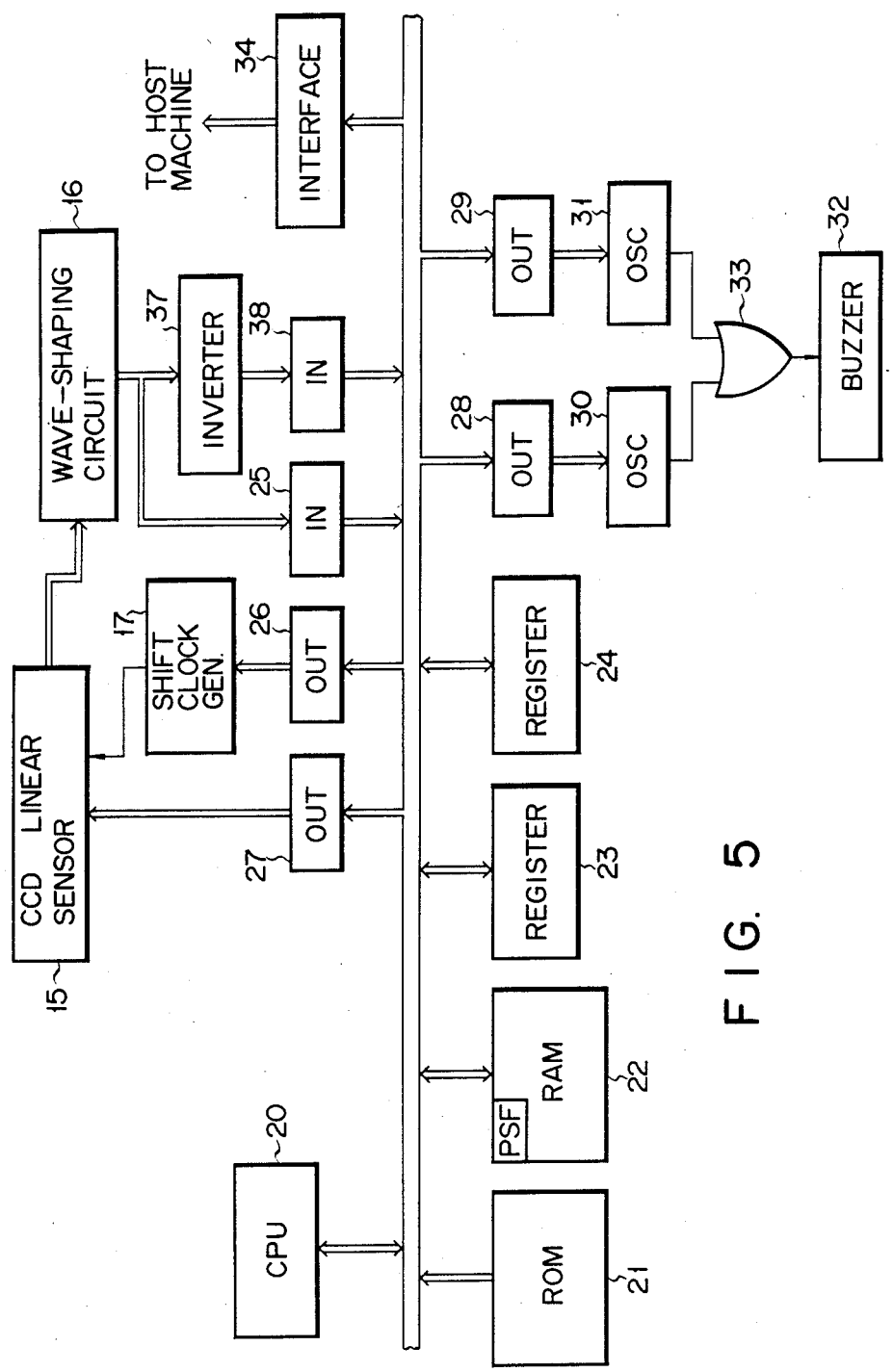
FIG. 5 is a block diagram of a bar code reading apparatus according to one embodiment of the invention.

FIG. 5 is a block diagram of a bar code reading apparatus according to one embodiment of the present invention. The bar code reading apparatus includes: a central processing unit (CPU) 20, a read only memory (ROM) 21, a random access memory (RAM) 22, and registers 23 and 24. The CPU 20 is connected to the wave-shaping circuit 16 through an input port 25, and coupled to the shift clock generator circuit 17, CCD linear sensor 15, and oscillators 30 and 31 through output ports 26 to 29, respectively. Output signals of the oscillators 30 and 31 are supplied to a buzzer 32 through an OR gate 33. The CPU 20 is further connected, through a serial transfer interface 34, to a host machine (not shown) such as a cash register or the like. An output terminal of the wave-shaping circuit 16 is connected to the CPU 20 through an inverter 37 and an input port 38.

The operation of the bar code reading apparatus shown in FIG. 5 will now be explained.

Figure 6A:
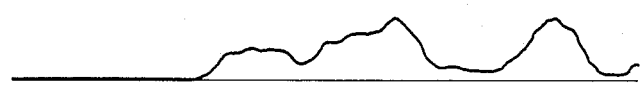
FIGS. 6A, 6B and 6C are signal waveform diagrams illustrating the operation of the hand held scanner in FIG. 1.
Figure 6B:
Figure 6C:
Figure 7:
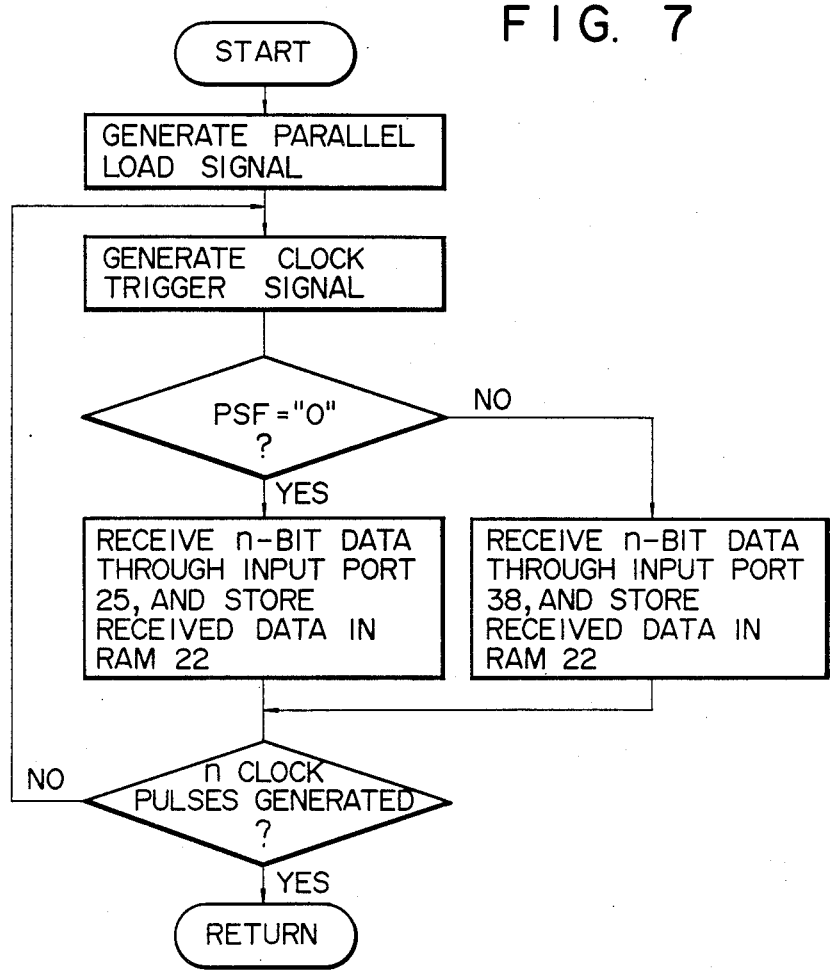
FIG. 7 is a flowchart showing a processing routine of an output signal from a CCD linear sensor in FIG. 5.

When the detecting surface of the hand held scanner 11 comes into contact with the label 2, the photodiodes $PD_l$ to $PD_n$ of the CCD linear scanner 15 generate output signals in response to the light and shade of the bar code 3, as shown in FIG. 6A. Thereafter, the CPU 20 generates a parallel load signal shown in FIG. 6B at a timing as will be mentioned later in accordance with the flowchart of FIG. 7. In response to the parallel load signal, the output signals from the photodiodes $PD_l$ to $PD_n$ are loaded, in parallel, as bit signals into n stages of the shift register SR through the shift gates $SG_l$ to $SG_n$, respectively. Next, the CPU 20 supplies a clock trigger signal to the shift clock generator circuit 17, thereby allowing the n bit signals of "0" and or "1", loaded into the shift registers SR, to be sequentially supplied to the wave-shaping circuit 16 in response to shift clock pulses, shown in FIG. 6C, which are generated from the shift clock generator circuit 17. The bit signals supplied to and processed in the waveshaping circuit 16 in this way are then fetched by the CPU 20 through the input port 25 or 38 in accordance with the content of an input port selection flag PSF in the flag area in the RAM 22, and n-bit data corresponding to the n bit signals is then sequentially loaded into the RAM 22. When it is detected that a predetermined number of shift clock pulses have been generated from the shift clock generator circuit 17, namely, when it is detected that all bit signals have been supplied from the shift register SR to the wave-shaping circuit 16, a subroutine indicative of the reading operation of the bar code detected by the CCD linear sensor 15 shown in FIG. 7 is terminated and, at this time, n-bit data corresponding to the n bit signals is stored in the RAM 22.

Figure 8A:
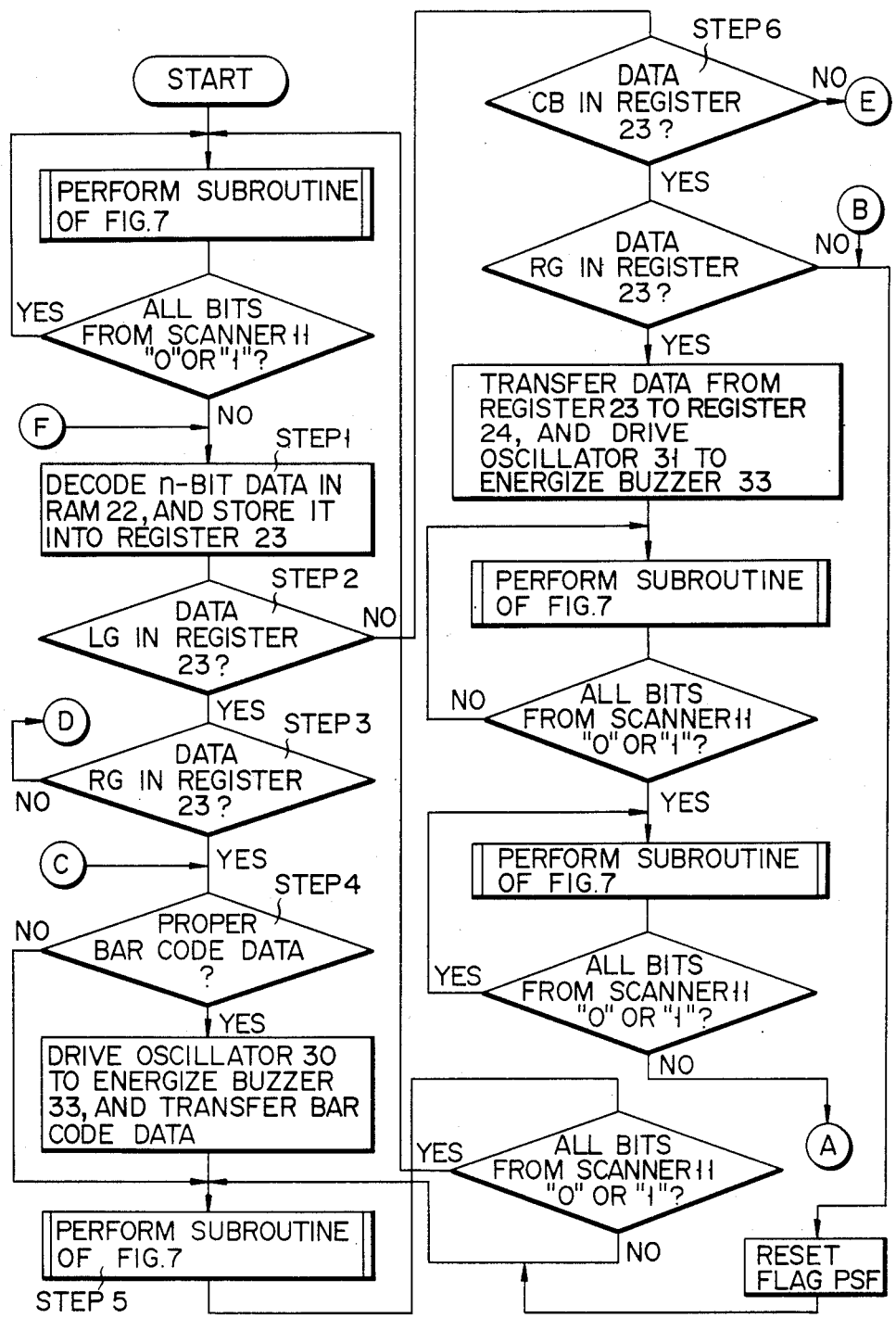

After completion of the reading operation of the bar code detected by the CCD linear sensor 15, the CPU 20 checks whether or not all bits of the n-bit data from the hand held scanner 11 are "0" or "1" on the basis of the n-bit data stored in the RAM 22, as shown in the flowchart of FIGS. 8A to 8C. When all bits of the n-bit data from the scanner 11 are "0" or "1", it is determined that the detecting surface of the scanner 11 has been removed from the label 2, so that the CPU 20 again executes the subroutine shown in FIG. 7. When it is detected that "0" and "1" bits are included in the n-bit data from the scanner 11, the CPU 20 decodes the n-bit data stored in the RAM 22 into corresponding bar code data, which it then stores into the register 23 in STEP 1. Next, the CPU 20 checks to see if the data LG, indicative of the left guard bar 5 of three modules, has been stored in the register 23 in STEP 2. If YES in STEP 2, the CPU 20 checks to see if the data RG, indicative of the right guard bar 9 of three modules, has been stored in the register 23 in STEP 3. If YES in STEP 3, the CPU 20 executes the module check in STEP 4 to see if the bar code data stored in the register 23 is correct. If YES in STEP 4, the CPU 20 supplies a drive signal to the oscillator 30 through the output port 28, thereby energizing the buzzer 32 in response to an output signal from the oscillator 30. At the same time, the CPU 20 transfers, through the interface 3y the bar code data in the register 23 to the host machine. Thereafter, the CPU 20 executes, in STEP 5, the subroutine shown in FIG. 7. After confirmation that all bits of the n-bit data from the scanner 11 are "0" or "1", the CPU 20 reexecutes this processing routine from the beginning. Even if NO in STEP 4, STEP 5 is still executed.

A YES in STEP 4, combined with the ringing of the buzzer 32 in response to the output signal from the oscillator 30, means that all of the bar code 3 has been reflected into the detecting surface of the scanner 11 and detected by the single reading operation. In other words, in FIG. 5, a reading completion informing circuit is constituted by the oscillator 30 and buzzer 32. When the entire bar code 3 is detected by the single reading operation in this way, the left guard bar data LG, right guard bar data RG; center bar data CB, indicative of the center bar 7; and character data representative of the data characters 6 and 8 on both sides of the center bar data CB, as shown in FIG. 9A, are stored in the register 23.

If NO in STEP 2, a check is made to see if the center bar data CB has been stored in the register 23 in STEP 6. If YES in STEP 6, a check is made to see if the right guard bar data RG has been stored in the register 23. If the right guard bar data has not been stored, STEP 5 is executed after the flag PSF is reset. In contrast, if YES, indicating storage of the right guard bar data, the CPU 20 transfers the bar code data from the register 23 into the register 24, and supplies a drive signal to the oscillator 31 through the output port 29, thereby energizing the buzzer 32 in response to an output signal from the oscillator 31. The oscillating frequencies of the oscillators 30 and 31 differ from each other, so that the buzzer 32 generates two kinds of sounds having different pitches. By listening to the sound generated from the buzzer 32 energized by the output signal from the oscillator 31, the operator can confirm that at least the right or left half of the bar code was read out in the first bar code reading operation.

Now, assuming that the scanner 11 has been located at a position on the right side of the bar code 3 and has been set on the label 2 in the first bar code reading operation, the right guard bar data RG, center bar data CB, and character data between these data RG and CB are stored in the register 23 as shown in, for example, FIG. 9B. In contrast, the left guard bar data LB and a part of the character data on the left side of the center bar data CB are stored, as undecodable data F, into the register 23. After the bar code data in the register 23, including the undecodable data F has been transferred to the register 24, the CPU 20 waits until all bits of the n-bit data from the scanner 11 become "0" or "1", that is, until the scanner 11 is moved away from the label 2. After it has been detected that all bits in the n-bit data from the scanner 11 became "0" or "1", the CPU 20 waits until "0" and "1" bit signals are supplied from the scanner 11, namely, until the scanner 11 again comes into contact with the label 2.

Thereafter, the CPU 20 decodes the n-bit data stored in the RAM 22, stores the decoded bar code data into the register 23 and then checks to see if the left guard bar data LG is present in the register 23 in STEP 7. If NO in STEP 7, STEP 5 is executed after the flag PSF is reset. If YES, a check is made to see if the center bar data CB has been stored in the register 23. If NO in this step, STEP 5 is executed after the flag PSF is reset and, if YES in thus step, the right guard bar data RG in the register 24, along with the character data stored in the digits on the right side of the center bar data CB, are transferred to the digit locations on the right side of the center bar data CB in the register 23. Thus, by combining the bar code data (shown in FIG. 9C) stored in the register 23 and obtained through the second bar code reading operation with the bar code data (shown in FIG. 9B) stored in the register 24 and derived through the first reading operation, the bar code data, including the right guard bar data RG, center bar data CB, left guard bar data LB, and character data, as shown in FIG. 9D, is stored in the register 23. Thereafter, the CPU 20 executes STEP 4.

In the case where the scanner 11 is set to read the left portion of the bar code 3 in the first reading operation, YES is indicated in STEP 2 and NO in STEP 3. Thereafter, the CPU 20 checks to see if the center bar data CB has been stored in the register 23 in STEP 8. If YES in STEP 8, the content of the register 23 is transferred to the register 24 in a similar manner as explained above and, thereafter, the CPU 20 energizes the buzzer 32 by the output signal from the oscillator 31. After that, if the scanner 11 is set to read the right portion of the bar code 3 in the second reading operation, the CPU 20 stores the bar code data obtained by decoding the n-bit data in the RAM 22 into the register 23. Next, the CPU 20 checks to see if the right guard bar data RG has been stored in the register 23 in STEP 9. If NO in STEP 9, STEP 5 is executed after the flag PSF is reset. If YES in STEP 9, after it has been detected that the center bar data CB has been stored in the register 23, the left guard bar data LG in the register 24 and the character data stored in the digit locations to the left of the center bar data CB are transferred to the digit locations on the left side of the center bar data CB of the register 23, respectively. Then, the CPU 20 performs the module check in STEP 4.

If NO in STEP 6 or 8, the CPU 20 checks to see if the n-bit data was received through the input port 25 in STEP 10. If NO in STEP 10, STEP 5 is executed after the input port selection flag PSF is reset. If YES in STEP 10, the bar code reading operation shown in FIG. 7 is executed after the input port selection flag PSF is set. However, in this case, since the flag PSF is set, the CPU 20 determines that the bar code having a higher brightness than its background is printed, so that it receives the n-bit data through the input port 38 instead of the input port 25. Subsequently, the CPU 20 executes STEP 1 in a manner similar to that mentioned above.

As described above, in this embodiment, the n-bit data from the scanner 11 is detected through the input port 25 in the ordinary operation mode so as to detect the bar code of lower brightness than its background. When it is detected that neither the center bar code nor one of the right and left guard bars can be detected in the ordinary operation mode, the n-bit data from the scanner 11 are inverted so as to detect the bar code having a higher brightness than its background and, thereafter, read through the input port 38.

FIG. 10 shows a block diagram of a bar code reading apparatus according to another embodiment of the present invention. This bar code reading apparatus is constituted and operates in a manner similar to that shown in FIG. 5, with the exception that the input port 38 is omitted and a signal selection switch 40 used to selectively supply either one of the output signals of the wave-shaping circuit 16 and inverter 37 to the input port 25. On one hand, the signal selection switch 40 is set in the first switching position by way of, for example, a manual operation when reading a bar code of lower brightness than its background, and transmits the output signal from the wave-shaping circuit 16 to the input port 25. On the other hand, when reading a bar code of higher brightness than the background, the switch 40 is set in the second switching position and transmits the output signals generated from the wave-shaping circuit 16 and inverted by the inverter 37 to the input port 25.

Figure 11:
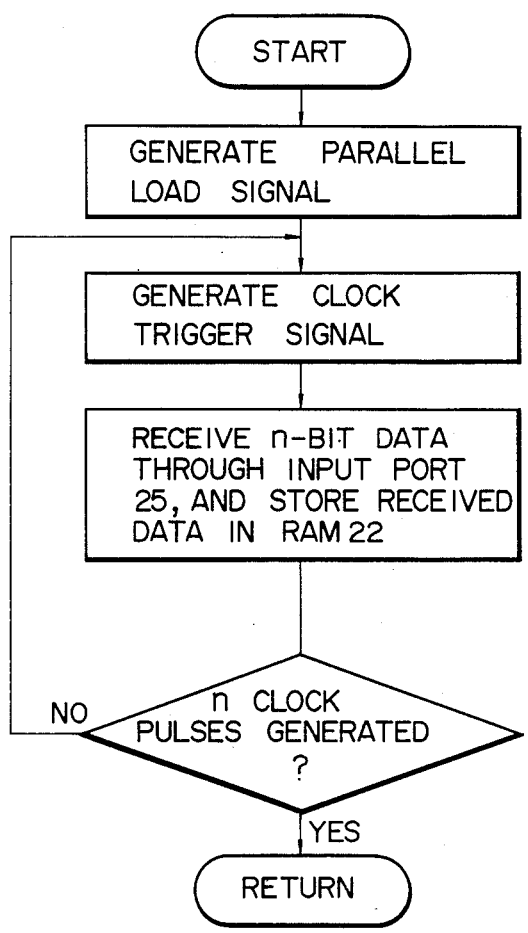
FIG. 11 is a flowchart showing a processing routine of an output signal from a CCD linear sensor in FIG. 10.

FIG. 11 is a flowchart showing the reading operation of the bar code detected by the CCD sensor 15 shown in FIG. 10. In this embodiment, since the n-bit data supplied through the input port 25 always accurately represents the bar code, irrespective of the kinds of bar codes, the n-bit data from the scanner 11 can be written as is into the RAM 22 without, moreover, the need of the flag PSF.

Figure 12A:
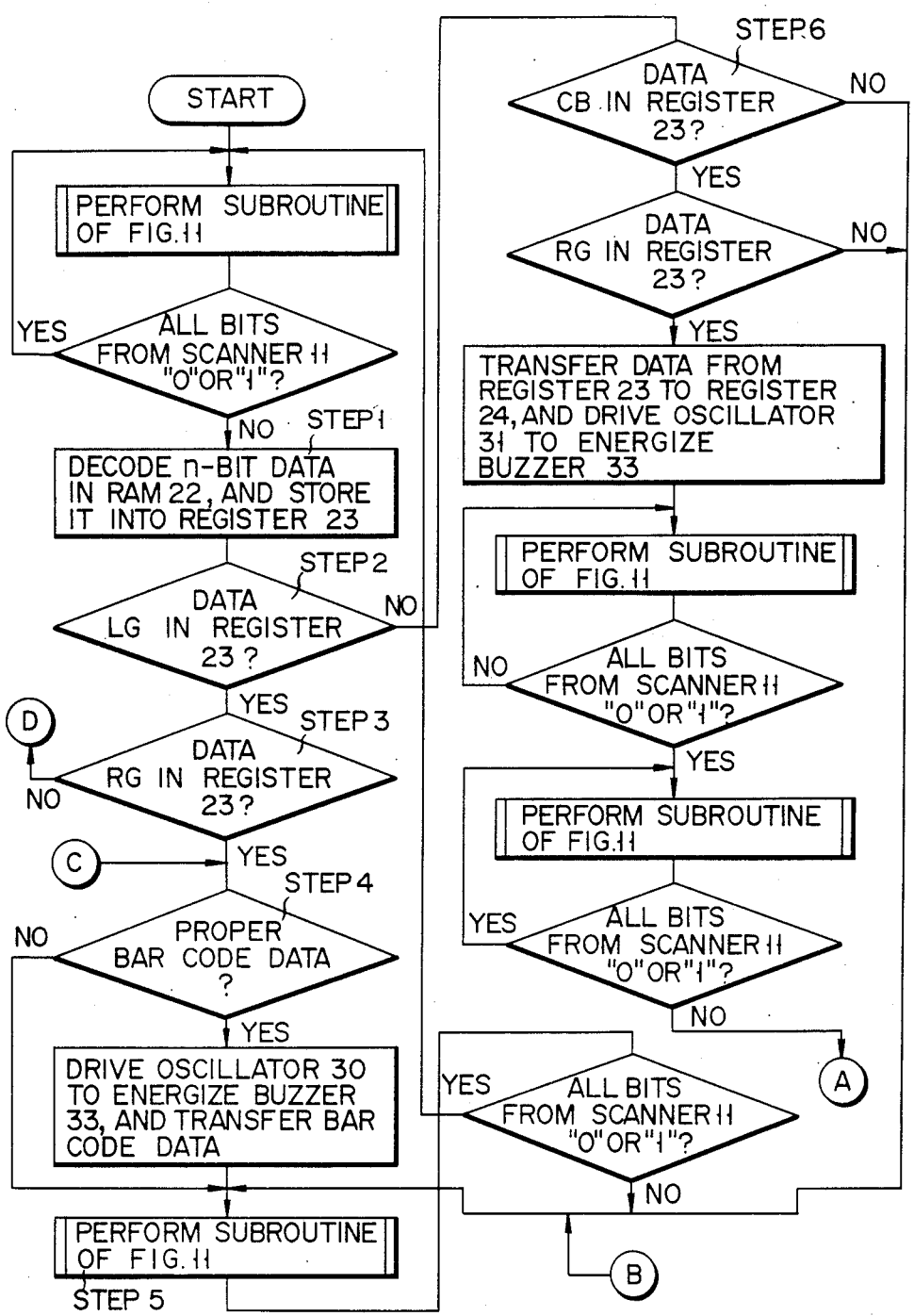
FIGS. 12A to 12C are flowchart explaining the operation of the bar code reading apparatus shown in FIG. 10.
Figure 12B:
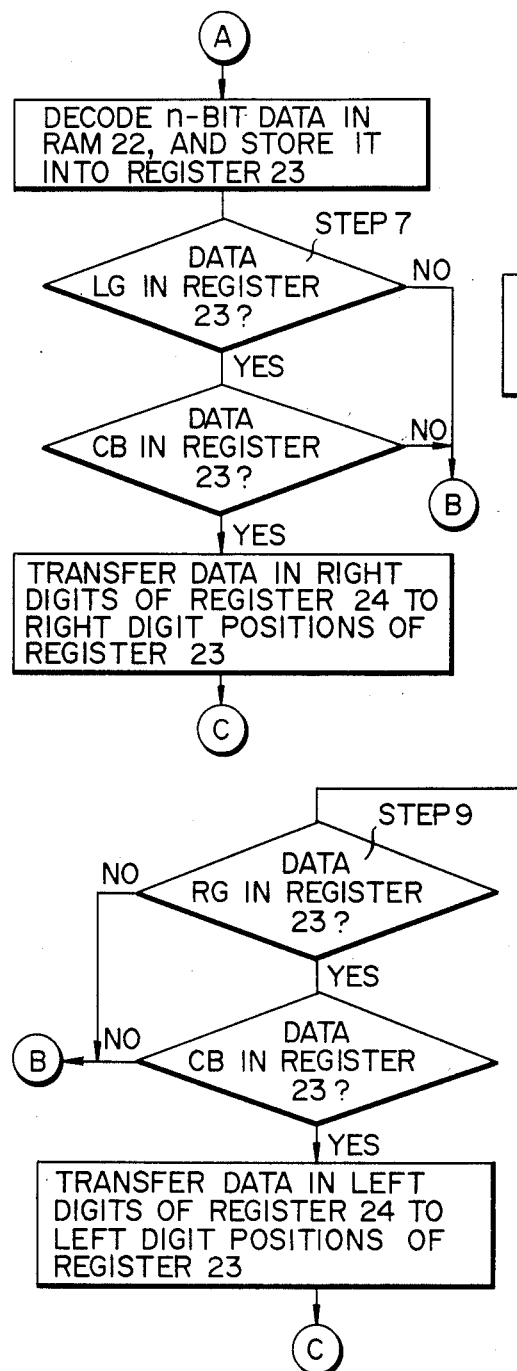
Figure 12C:
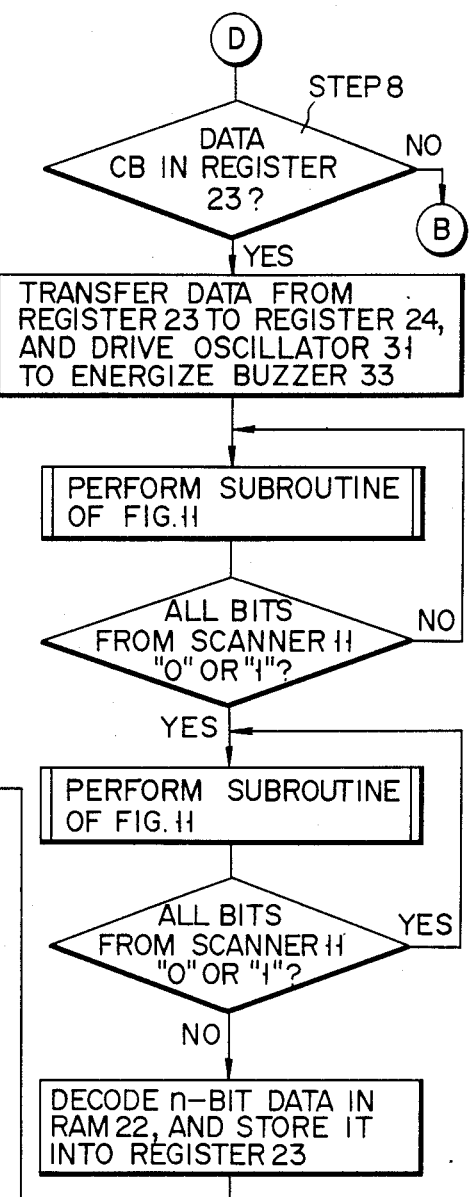

FIGS. 12A to 12C are flowcharts showing the operation of the bar code reading apparatus shown in FIG. 10. These flowcharts are similar to those shown in FIGS. 8A to 8C, with the exception that STEP 5 is immediately executed if NO is indicated in STEP 6 or 8, and the subroutine shown in FIG. 11 is used in place of the subroutine shown in FIG. 7. In this embodiment, since the bar code data which always accurately represents the bar code, irrespective of the kinds of bar codes, is stored in the register 23, by checking the bar code in the register 23 it is possible to easily check whether the left guard bar data LG, right guard bar data RG or center bar data CB has been stored in the register 23 or not.

Figure 13:
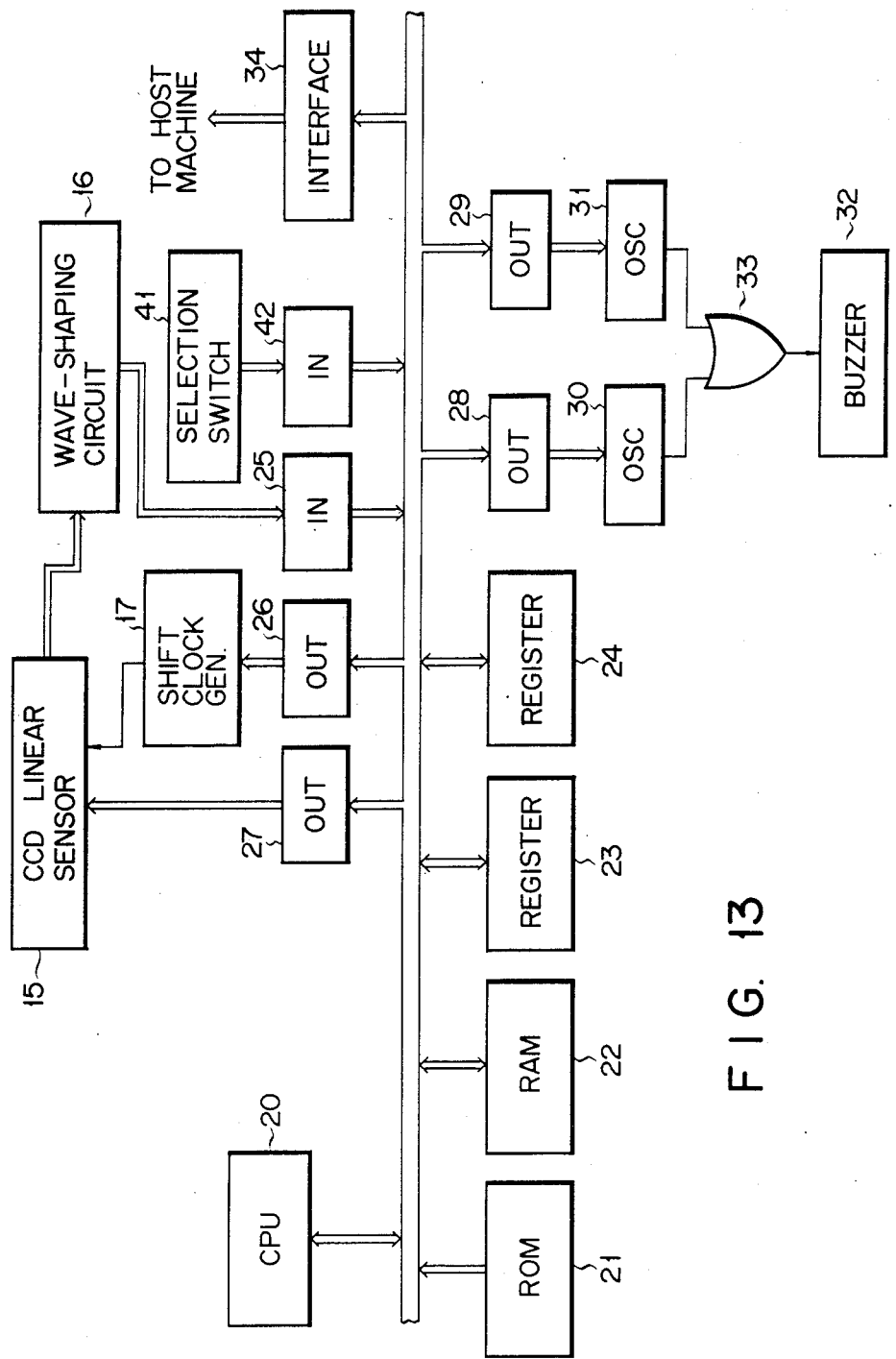
FIG. 13 is a block diagram of a bar code reading apparatus according to still another embodiment of the invention.

FIG. 13 is a block diagram of a bar code reading apparatus according to still another embodiment of the invention. This bar code reading apparatus is constituted and operates in a manner similar to that shown in FIG. 5, with the exception that the inverter 37 and input port 38 are omitted and a selection switch 41 is connected to the CPU 20 through an input port 42. When reading a bar code of lower brightness than the background, the selection switch 41 is set in the ON position by way of, for instance, a manual operation. In contrast, when reading a bar code of higher brightness than the background, the switch 41 is set in the OFF state.

Figure 14:
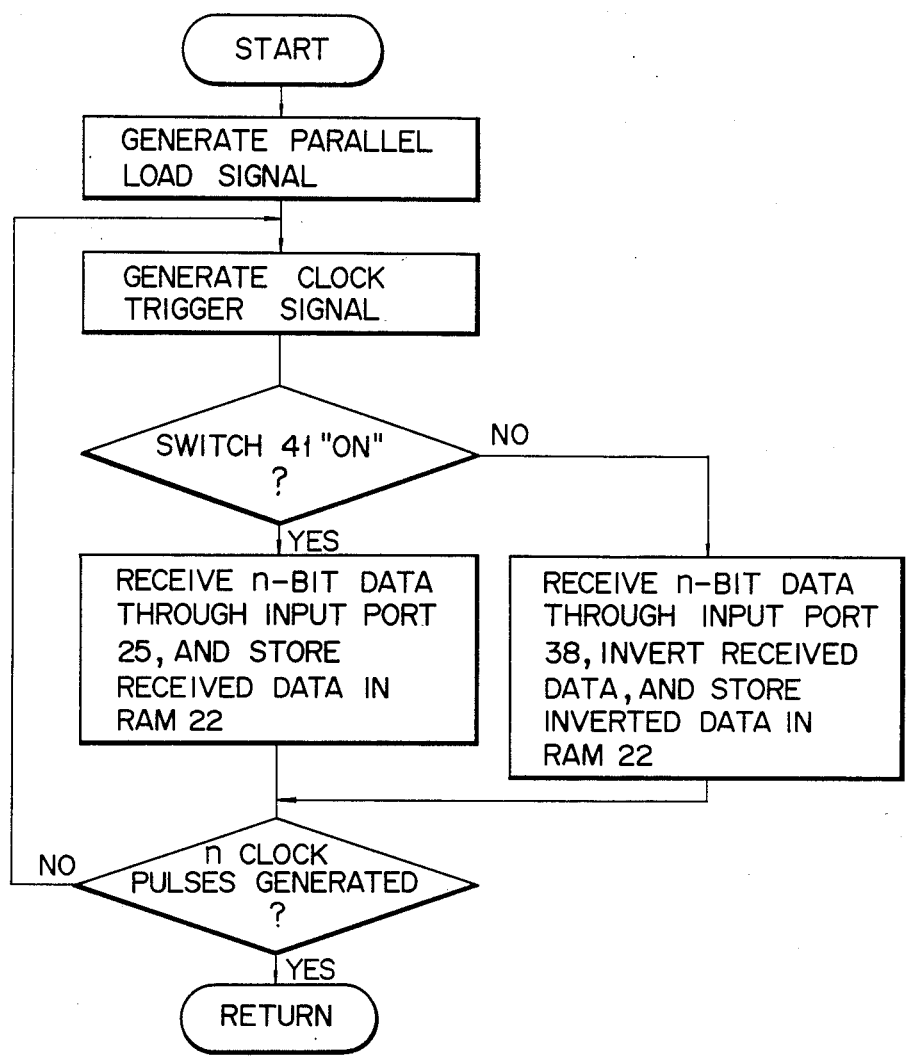
FIG. 14 is a flowchart showing a processing routine of an output signal from a CCD linear sensor in FIG. 13.

FIG. 14 is a flowchart showing the reading operation of the bar code detected by the CCD sensor 15 shown in FIG. 13. The CPU 20 in this case writes the data received through the input port 25 as is in the RAM 22 or, conversely, in this case writes the received data after it has been inverted in the RAM 22, depending on the switching position of the selection switch 41. In this case, the CPU 20 discriminates the kind of bar code by checking the switching position of the selection switch 41, so that the flag PSF is unnecessary.

The operation of the bar code reading apparatus shown in FIG. 13 is executed substantially in accordance with the flowcharts shown in FIGS. 12A to 12C, with the exception that the subroutine shown in FIG. 14 is used instead of the subroutine of FIG. 11. Even in this embodiment, the bar code data which always accurately represents the bar code irrespective of the kinds of bar codes is stored in the register 23, so that an effect similar to that of the bar code reading apparatus shown in FIG. 10 is obtained.

Although the present invention has been described with respect certain embodiments, it is not limited to only these embodiments. For example, in the case where NO is indicated in STEP 7 or 9, as per the flowcharts of FIGS. 8A to 8C and 12A to 12C, the flow of the apparatus can be altered to execute the process of "perform subroutine of FIG. 7 or 11", which occurs three steps before STEP 7 or 9.

Further, in the embodiment shown in FIG. 5, the inverter 37 and input port 38 may be omitted, and the process, executed when NO is indicated in the step of "PSF='0'?", of the flowchart shown in FIG. 7 can be changed to the process of "receive n-bit data through input port 25, invert received data and store inverted data in RAM 22".

What is claimed is:

1. A bar code reading apparatus comprising:
   reading means for optically reading a bar code and generating an output data corresponding to said bar code;
   mode selecting means for selectively setting either one of first and second modes;
   memory means; and
   data processing means which, when the first mode is designated by said mode selecting means, stores the output data from said reading means into said memory means and which, when the second mode is set by said mode selecting means, stores the inverted data of the output data from said reading means into said memory means, and thereby making a bar code data in accordance with the content of said memory means.

2. A bar code reading apparatus according to claim 1, wherein said data processing means includes a first memory and a data processing unit for decoding the content of said memory means into bar code data and storing the decoded data into said first memory.

3. A bar code reading apparatus according to claim 2, wherein said bar code includes right and left guard bars and a center bar, said mode selecting means is a flag memory, and said data processing unit writes data indicative of the second mode into said flag memory when it is detected that neither the center bar nor one of the right and left guard bars is included in the bar code data stored in said first register.

4. A bar code reading apparatus according to claim 3, wherein said data processing means has inverting means for inverting the output data from said reading means, and said data processing unit selectively stores either one of the output data from said reading means and inverting means into said memory means in accordance with the mode designated by said mode selecting means.

5. A bar code reading apparatus according to claim 2, wherein said data processing means further has inverting means for inverting the output data from said reading means, and said mode selecting means is switching means for selectively supplying either one of the output data from said reading means and inverting means to said data processing unit.

6. A bar code reading apparatus according to claim 2, wherein said mode selecting means is switching means which is selectively set into either one of the first and second mode positions, and said data processing means stores the output data from said reading means as it is or as an inverted state into said memory means in accordance with the mode position of said switching means.

7. A bar code reading apparatus according to claim 2, which further comprises informing means for informing the result of bar code readout operation, and in which said bar code includes right and left guard bars and a center bar, and said data processing unit supplies an energization signal to said informing means when it is detected that the center bar and at least one of the right and left guard bars are stored in said first memory.

8. A bar code reading apparatus according to claim 7, wherein said informing means has first and second drive means and a buzzer, said data processing means further has a second memory, and said data processing unit transfers the content of the first memory into said second memory when it is detected that the center bar and one of the right and left guard bars are stored in the first memory in a first readout operation and also supplies a drive signal to said first drive means to allow the buzzer to ring, while in a second readout operation, said data processing unit transfers one of the right and left guard bars in said second memory and data between the center bar and one of the right and left guard bars into the first memory when it is detected that the center bar and said one of the right and left guard bars are stored in the first memory, and in the first or second readout operation, said data processing unit supplies a drive signal to said second driving means to allow the buzzer to ring after confirming that the bar code data in the first memory is suitable when it is detected that all of the right and left guard bars and center bar are stored in the first memory.

9. A bar code reading apparatus according to claim 2, wherein said data processing means has inverting means for inverting the output data from said reading means, and said data processing unit selectively stores either one of the output data from said reading means and inverting means into said memory means in accordance with the content of said mode selecting means.

10. A bar code reading apparatus according to claim 1, wherein said mode selecting means is switching means which is selectively set into either one of the first and second mode positions, and said data processing means stores the output data from said reading means as it is or as an inverted state into said memory means in accordance with the mode position of said switching means.

* * * * *